(12) United States Patent
Kakadia et al.

(10) Patent No.: US 9,131,390 B2
(45) Date of Patent: Sep. 8, 2015

(54) OPTIMIZATION OF TRANSMISSION CONTROL PROTOCOL (TCP) CONNECTIONS IN A WIRELESS NETWORK

(71) Applicants: Verizon Patent and Licensing Inc., Arlington, NJ (US); Cellco Partnership, Arlington, NJ (US)

(72) Inventors: Deepak Kakadia, Union City, CA (US); Xin He, Basking Ridge, NJ (US); Zuhair B. Moin, Danville, CA (US); Rakesh H. Chandwani, Freehold, NJ (US); Lalit R. Kotecha, San Ramon, CA (US)

(73) Assignees: Verizon Patent and Licensing Inc., Basking Ridge, NJ (US); Cellco Partnership, Basking Ridge, NJ (US)

(*) Notice: Subject to any disclaimer, the term of this patent is extended or adjusted under 35 U.S.C. 154(b) by 203 days.

(21) Appl. No.: 13/781,661

(22) Filed: Feb. 28, 2013

(65) Prior Publication Data

US 2014/0241159 A1 Aug. 28, 2014

(51) Int. Cl.
*H04W 24/02* (2009.01)
*H04L 12/24* (2006.01)
*H04L 12/26* (2006.01)

(52) U.S. Cl.
CPC ............ *H04W 24/02* (2013.01); *H04L 41/083* (2013.01); *H04L 43/08* (2013.01); *H04L 43/0829* (2013.01); *H04L 43/0852* (2013.01); *H04L 43/0888* (2013.01)

(58) Field of Classification Search
None
See application file for complete search history.

(56) References Cited

U.S. PATENT DOCUMENTS

| 2002/0107026 | A1* | 8/2002 | Agrawal et al. | 455/453 |
|---|---|---|---|---|
| 2003/0046388 | A1* | 3/2003 | Milliken | 709/224 |
| 2003/0179703 | A1* | 9/2003 | Levy et al. | 370/230 |
| 2005/0041584 | A1* | 2/2005 | Lau et al. | 370/235 |
| 2012/0257499 | A1* | 10/2012 | Chatterjee et al. | 370/232 |
| 2014/0050095 | A1* | 2/2014 | Szilagyi et al. | 370/236 |
| 2014/0105035 | A1* | 4/2014 | Lam et al. | 370/252 |

OTHER PUBLICATIONS

Author: Gomez et al. Title: QoS modeling for End-to-End Performance evaluation over networks with wireless access Publisher: EURASIP Journal on wireless communications and networking Published: Mar. 2010.*

\* cited by examiner

*Primary Examiner* — Chirag Shah
*Assistant Examiner* — Rina Pancholi

(57) ABSTRACT

Network parameters implemented in a number of network devices may be optimized. In one implementation, a device may receive values for a network parameters, the network parameters including network parameters associated with devices in a network. At least a first portion of the network parameters may relate to traffic control in transmission control protocol (TCP) sessions in the network and at least a second portion of the network parameters may relate to data transmission in a radio access interface in the network. The device may further receive values for performance indicators that define a performance of one or more aspects of the network. The device may further modify one or more of the network parameters based on the received values for the network parameters and based on the received performance indicators, to optimize performance of the network with respect to the performance indicators.

20 Claims, 13 Drawing Sheets

OPTIMIZATION OF TRANSMISSION CONTROL PROTOCOL (TCP) CONNECTIONS IN A WIRELESS NETWORK

BACKGROUND

Transmission Control Protocol (TCP) is a commonly used protocol, in the Internet Protocol (IP) suite, that provides data transmission services to application programs. For example, when an application program desires to send data, instead of breaking the data into smaller pieces and issuing a series of IP requests, the application program may issue a single request to a TCP component. The TCP component may, in turn, handle IP-related tasks associated with transmitting the data (e.g., breaking the data into smaller pieces and issuing multiple IP requests to transmit the data).

Wireless networks, such as cellular wireless networks, may provide network connectivity to mobile devices, such as cellular telephones. The mobile devices may connect to other devices, such as servers within a packet data network connected to the wireless network, using a number of possible protocols, including TCP. A TCP session may be associated with a number of parameters that can be used to optimize the effectiveness of data transferred in the TCP session. The wireless network may similarly be associated with parameters that may be used to optimize the data transfer for the radio (wireless) interface.

DETAILED DESCRIPTION OF PREFERRED EMBODIMENTS

The following detailed description refers to the accompanying drawings. The same reference numbers in different drawings may identify the same or similar elements.

Techniques described herein may provide for end-to-end optimization of network parameters. The network parameters may include parameters relating to both radio links, in the wireless network, and to parameters relating to TCP sessions. The optimal set of network parameters may be determined through analytics applied to one or more network performance indicators (e.g., throughput, latency, or packet loss) that are measured for different combinations of the set of network parameters. In one implementation, the analytics may be applied by incrementally modifying the network parameters to cause changes in performance indicators of the network until an acceptable or optimal set of network parameters is determined.

Figure 1:
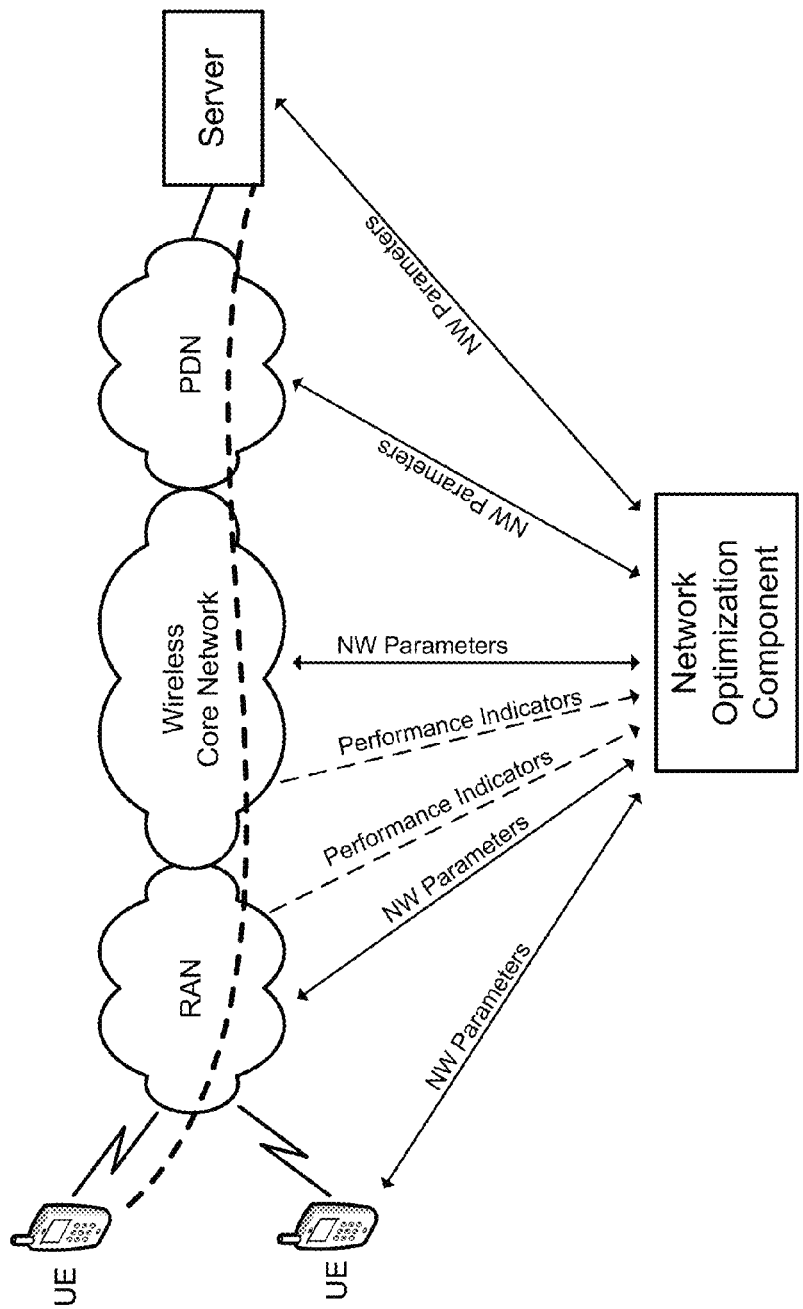
FIG. 1 is a diagram conceptually illustrating an example of an overview of concepts described herein.

FIG. 1 is a diagram conceptually illustrating an example of an overview of concepts described herein. As shown in FIG. 1, user equipment (UE), such as a mobile device, may communicate with a server as part of a TCP session (illustrated by the curved line between the UE and the server). The physical transport layer for the TCP session may span a number of different types of network segments, such as a radio access network (RAN), a wireless core network, and a packet data network (PDN). Consistent with aspects described herein, TCP sessions, such as the illustrated TCP session, may be optimized based on analytics applied to network parameters.

The network parameters may include a set of parameters associated with multiple devices that participate in the providing of the TCP session. In one implementation, the network parameters may be parameters associated with devices over an entire extent of the TCP session (e.g., the network parameters may be end-to-end parameters). The network parameters may include, for example, TCP static configuration parameters (e.g., parameters that are designed to be configured before initiating a TCP process), TCP tunable parameters (e.g., parameters that may be dynamically modified during the operation of a TCP session), static and tunable parameters relating to operation of the RAN (e.g., parameters used by the UEs or by a base station in the wireless core network), and/or other parameters.

As illustrated in FIG. 1, a network optimization component may receive the network parameters ("NW Parameters") from various network devices in the end-to-end path of communication sessions. The network optimization component may also receive performance indicators ("Performance Indicators") that relate to the performance of the network, such as information relating to the performance of one or more TCP sessions. The performance indicators may include statistics relating to the operation of the TCP sessions, such as average throughput, latency, and/or packet loss data relating to the operation of the TCP sessions. In one implementation, the performance indicators may include a value that quantifies the theoretical capacity of the RAN relative to the capacity that is actually used by the TCP sessions.

The network optimization component may apply analytic techniques to the performance indicators and the network parameters. Based on the analytic techniques, optimal values for the network parameters may be determined. In some implementations, the network optimization component may iteratively modify various ones of the network parameters based on monitoring of the performance indicators.

Figure 2:
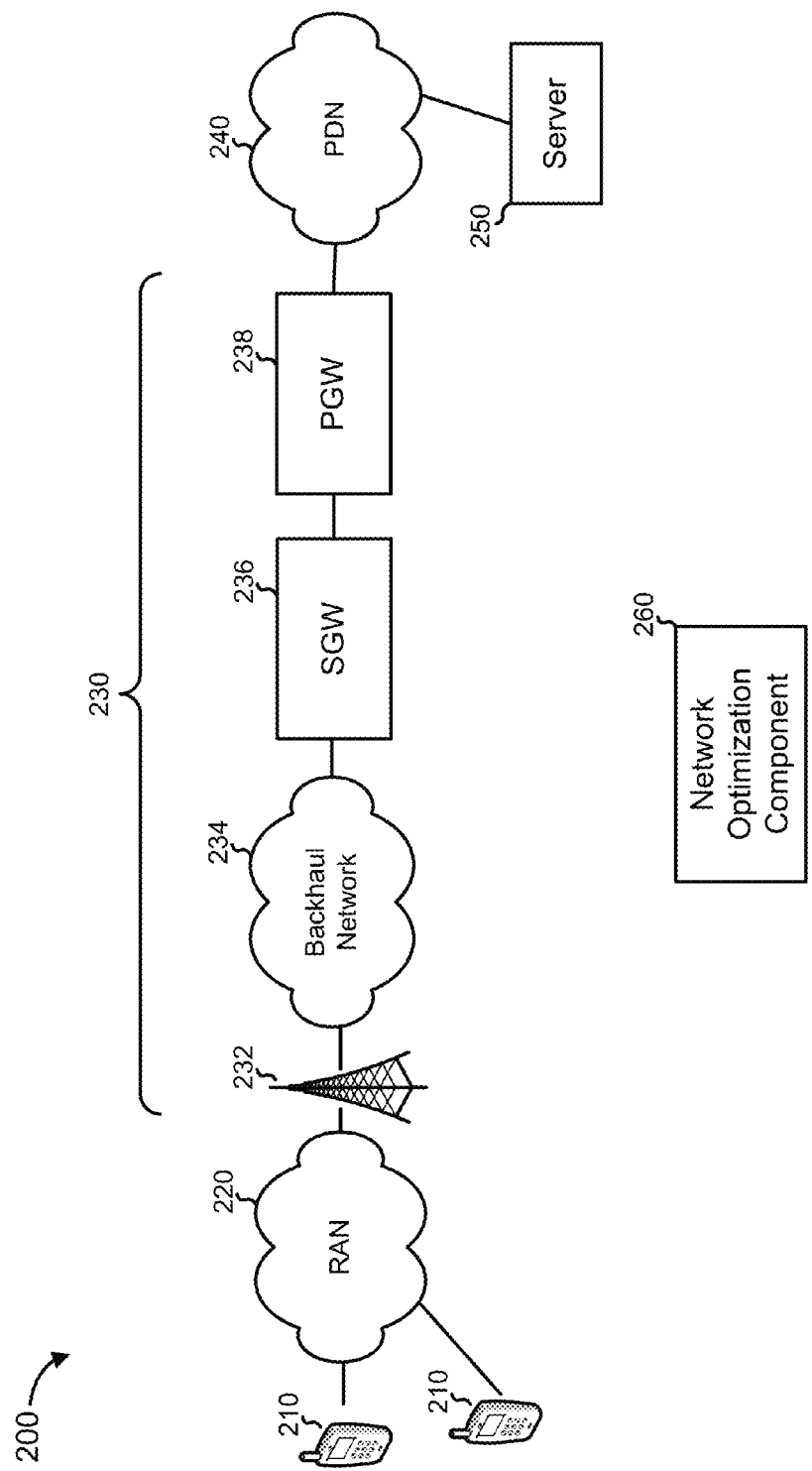
FIG. 2 is a diagram of an example environment in which systems and/or methods described herein may be implemented.

FIG. 2 is a diagram of an example environment 200 in which systems and/or methods described herein may be implemented. Environment 200 may represent, in additional detail, one implementation of the environment shown in FIG. 1. As illustrated, environment 200 may include one or more UEs 210, RAN 220, wireless core network 230 (shown by base station 232, backhaul network 234, a serving gateway (SGW) 236, and packet data network gateway (PGW) 238), PDN 240, server 250, and network optimization component 260.

UEs 210 may include portable computing and communication devices, such as a personal digital assistant (PDA), a smart phone, a cellular phone, a laptop computer with connectivity to a cellular wireless network, a tablet computer, etc. UEs 210 may also include non-portable computing devices, such as desktop computers, consumer or business appliances, set-top devices (STDs), or other devices that have the ability to connect to RAN 220. UEs 210 may connect, through a radio link, to RAN 220. Through the radio link, UEs 210 may obtain data and/or voice services, such as services provided through TCP session(s).

RAN 220 may include one or more devices that include radio interfaces to provide wireless connections to UEs 210. RAN 220 may include a radio access network for a cellular network.

Wireless core network 230 may implement a network that provides routing, control, and data transmission services for UEs 210. Wireless core network 230 may connect to one or more other networks, such as to PDN 140 (e.g., the Internet), to provide network service to UEs 210. In one implementation, wireless core network 230 may implement an LTE network. In this situation, wireless core network 230 may be implemented using a flat, IP-based network architecture that includes one or more network devices or components that facilitate the providing of network access to UEs 210. Wireless core network 230 may include a number of network devices that may be used to implement the LTE network. For example, as illustrated, wireless core network 230 may include a base station (such as eNodeB 232), a backhaul network 234, a serving gateway (SGW) 236, and a packet data network gateway (PGW) 236. Wireless core network 230 may be implemented using other technologies and include other or different network devices.

Base station 232 may provide one or more radio interfaces over which eNodeB 232 may communicate with UEs 210 to thus implement RAN 220. The radio interfaces may include, for example, orthogonal frequency-division multiplexing (OFDM) and/or single-carrier frequency-division multiple access (SC-FDMA) based radio interfaces. In the context of an LTE network, base station 232 may be referred to as an eNodeB, and will be referred to as eNodeB hereinafter.

Backhaul network 234 may include one or more devices, such as switches and/or routers, that may be used to connect eNodeB 232 to SGW 236. In one implementation, backhaul network 234 may include an Ethernet-based backhaul network.

SGW 236 may include one or more computation and communication devices that route and forward user data packets. SGW 236 may route and forward user packets and also act as a mobility anchor during inter-base station handoffs.

PGW 238 may provide connectivity from mobile devices to external PDNs, such as PDN 240. PGW 238 may provide connectivity from UEs 210 to PDN 240 by being the point of exit and entry of traffic between wireless core network 230 and PDN 240. PGW 238 may perform policy enforcement, packet filtering, and charging support relating to the connectivity of UEs 210.

PDN 240 may include one or more packet networks, such as an Internet Protocol (IP) based packet network. PDN 240 may include a wide area network (WAN), a local area network (LAN), and/or combinations of WANs and LANs. UEs 210 may access PDN 240, through PGW 238, to obtain computation and/or data services from computing devices, such as server 250, connected to PDN 240.

Server 250 may include one or more computation and communication devices that provide data and/or computing services to connecting devices, such as to UEs 210. Server 250 may include, for example, a web server, a file server, or another type of server. In one implementation, when communicating with UEs 210, server 250 may use the TCP protocol. As described in more detail below, TCP sessions between a server, such as server 250, and one or more UEs 210, may be optimized by network optimization component 260.

Network optimization component 260 may include one or more computation and communication devices that operate to assist in optimizing performance of TCP sessions with UEs 210. Network optimization component 260 may receive information regarding network parameters from a number of network devices that may be associated with TCP sessions, such as UEs 210, network devices that handle control traffic in wireless core network 230 (or other networks), network devices that handle bearer traffic in wireless core network 230 (or other networks), servers 250, and/or other network devices. Network optimization component 260 may also receive performance indicators that relate to the performance of the TCP sessions in environment 200. Network optimization component 260 may then apply analytic techniques to the performance indicators and the network parameters. Based on the analytic techniques, optimal values for the network parameters may be determined. The operation of network optimization component 260 will be described in more detail below.

Although network optimization component 260 is illustrated, in FIG. 2, as a separate element in environment 200, in some implementations, network optimization component 260 may be implemented within wireless core network 230, within another network, and/or as functionality performed by another network device. Additionally, in other implementations, environment 200 may contain fewer components, different components, differently arranged components, or additional components than those depicted in FIG. 2. Alternatively, or additionally, one or more components of environment 200 may perform one or more other tasks described as being performed by one or more other components of environment 200.

Figure 3:
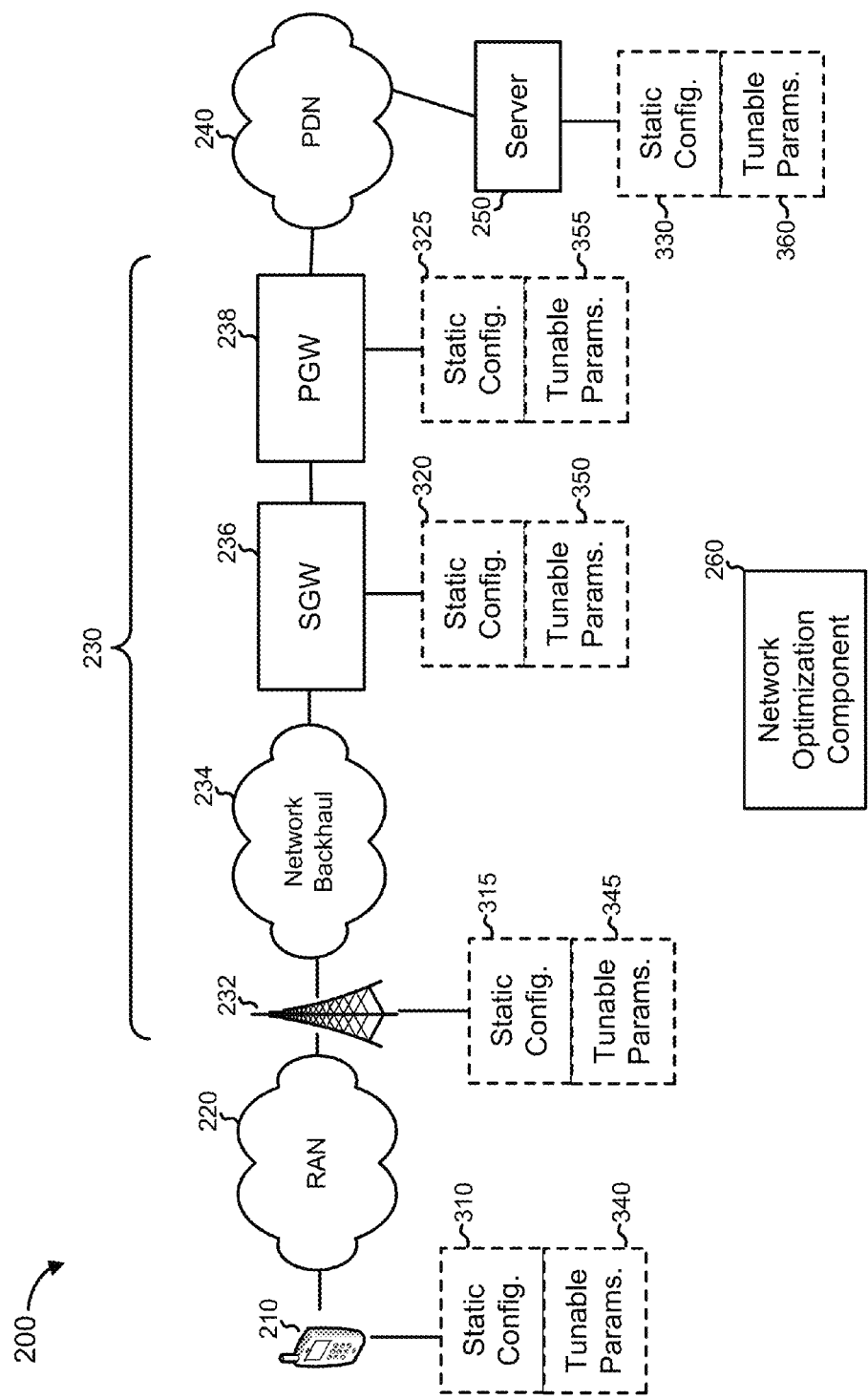
FIG. 3 is a diagram illustrating examples of network parameters that may be used by the network optimization component shown in FIG. 2.

FIG. 3 is a diagram illustrating, in the context of environment 200, examples of network parameters that may be used by network optimization component 260. The network parameters may generally be parameters that may affect the operation of TCP sessions in environment 200.

The various network devices in environment 200 may each be associated with one or more static configuration values and one or more tunable parameters. The "phrase static configuration values," as used herein, may refer to information that may be used to customize or configure the operation of a device. The static configuration values may be "static" in the sense that the configuration values may require a reboot of the network device and/or may otherwise not generally be designed to be applied during operation of the network device or during operation of a process or protocol implemented by the network device (e.g., during a TCP session). A static configuration value may be used to select a particular protocol or process that is implemented by the network. A tunable parameter, in contrast, may refer to a value that may be modified during run-time operation of a network device and may be used to tune or refine the operation of one or more processes and/or protocols that are being implemented by the network device.

In FIG. 3, UE 210, eNodeB 232, SGW 236, PGW 238, and server 250 are illustrated as being associated with static configuration values 310, 315, 320, 325, and 330, respectively.

Further, eNodeB 232, SGW 236, PGW 238, and server 250 are illustrated as being associated with tunable parameters 340, 345, 350, 355, and 360, respectively.

Examples of static configuration values may include parameters relating to the types or versions of protocols, relating to TCP performance, that are implemented by a network device. In general, the static configuration parameters may relate to coarse grain and/or long term network performance changes.

Examples of tunable parameters may include changeable parameters that are included as part of a particular protocol or network layer. For example, the tunable parameters may include parameters relating to the number of transmit/receive retries for a particular protocol and/or network layer, transmit/receive timeout value for a particular protocol and/or network layer, the particular transmission mode of a protocol (e.g., whether to use Acknowledged Mode (AM) or Unacknowledge Mode (UM) for data plane transport in the radio link control (RLC) layer), etc. In general, the tunable parameters may relate to fine grain and/or short term performance changes.

In some implementations, the performance of environment 200, with respect to TCP sessions, may be modeled as an M/M/1 queuing system. In queuing theory, an M/M/1 queueing node may represent a queueing point in a system in which arrivals are determined by a Poisson process and service times have an exponential distribution.

Figure 4:
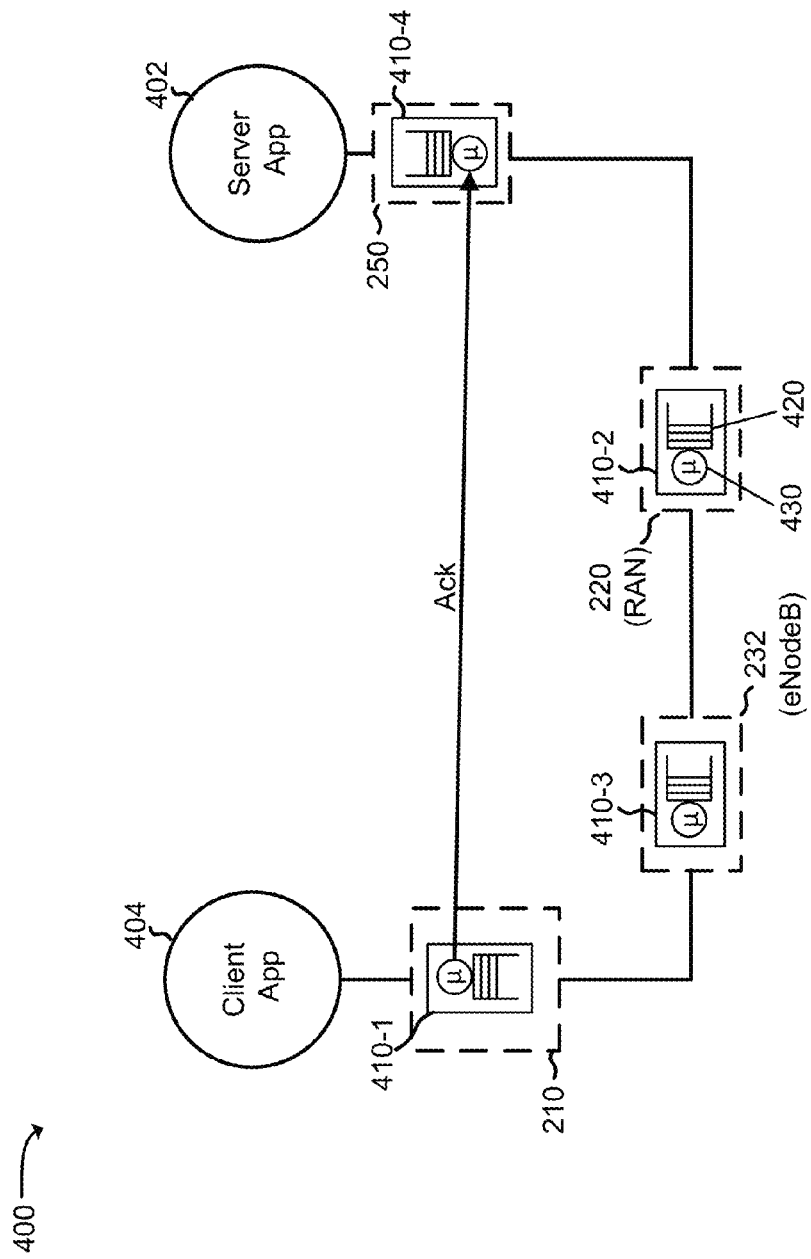
FIG. 4 is a diagram illustrating an example of a model of a system that is modeled using M/M/1 queues.

FIG. 4 is a diagram illustrating an example of a model 400 of a system that is modeled using M/M/1 queues. Model 400 may be used to simulate the performance of environment 200 with respect to processing at the TCP protocol level. In particular, server applications 402 ("server apps") may communicate with client applications 404 ("client apps") via TCP connection(s) that are formed between a number of network devices. The network devices, over which the TCP sessions are implemented, may correspond, for example, to the network devices shown in FIG. 2.

A number of M/M/1 queueing nodes, labeled as nodes 410-1 through 410-4, are illustrated in FIG. 4. Each node 410 may be modeled as a queue 420 and a service process 430. Further, each node 410 may be described by an arrival rate, $\lambda$, where $\lambda$ is the parameter for a Poisson process, and a node service time, $\mu$, where $\mu$ is the parameter for an exponential distribution. Queues 420 may be first-in-first-out (FIFO) queues that receive incoming items (e.g., packets or other data units) based on the arrival rate. Service processes 430 may process and output items, from the corresponding queues 420, based on the exponential distribution defined by $\mu$.

In the example illustrated, node 410-1 may correspond to UE 210, node 410-2 may correspond to RAN 220, node 410-3 may correspond to eNodeB 232, and node 410-4 may correspond to server 250. Model 400 may represent a closed loop feedback system in which static configuration values 310-330 and tunable parameters 340-360 may affect the respective values of $\mu$ for nodes 410.

Figure 5:
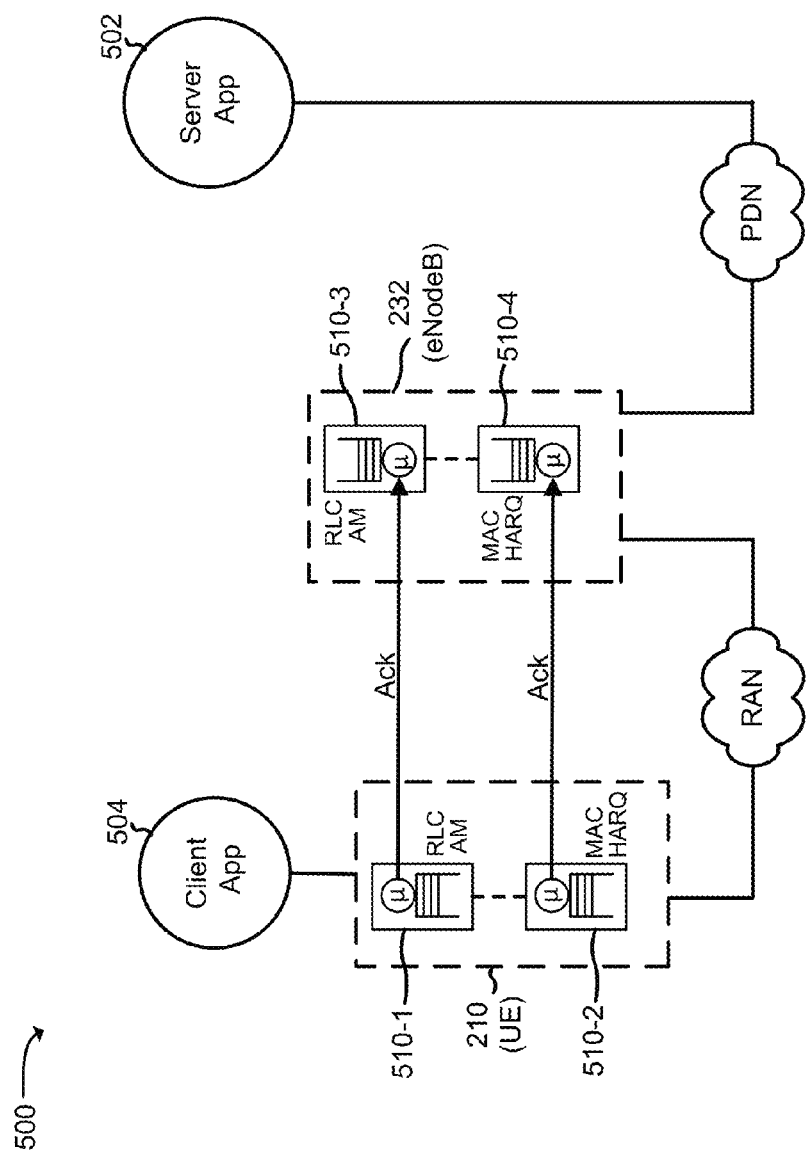
FIG. 5 is a diagram illustrating an example of a model of another system that may be modeled using M/M/1 queues.

FIG. 5 is a diagram illustrating an example of a model 500 of another system that may be modeled using M/M/1 queues. Model 500 may be used to simulate the performance of environment 200 with respect to the performance of the RLC and media access control (MAC) layers. In particular, the RAN interface between server applications 502 ("server apps") and client applications 504 ("client apps") may be modeled by a number of M/M/1 nodes, labeled as nodes 510-1 through 510-4.

In the example illustrated, nodes 510-1 and 510-2 may correspond to UE 210. For example, node 510-1 may represent queueing caused by AM mode communication in the RLC layer and node 510-2 may represent queueing caused by error correction processing, such as a hybrid automatic repeat request (HARD) processing in the MAC layer. Nodes 510-3 and 510-4 may represent queueing, caused by AM mode communication in the RLC and HARQ processing, corresponding to nodes 510-1 and 510-2, respectively. Nodes 510-3 and 510-4 may be implemented by eNodeB 232.

Models 400 and 500, as illustrated above, illustrate conceptual arrangements of M/M/1 nodes that may model TCP sessions (model 400) and the RAN interface (model 500). Additional or fewer nodes may be included in other implementations of models 400 and 500.

Static configuration values 310-330 and tunable parameters 340-360 may affect the value of $\mu$ for the nodes in models 400 and 500. In one implementation, network optimization component 260 may use models 400 and 500 when determining how to modify static configuration values 310-330 and/or tunable parameters 340-360. For example, network optimization component 260 may use models 400 and 500 to simulate how the performance indicators would change when certain changes are made to static configuration values 310-330 and/or tunable parameters 340-360 associated with network devices.

Figure 6:
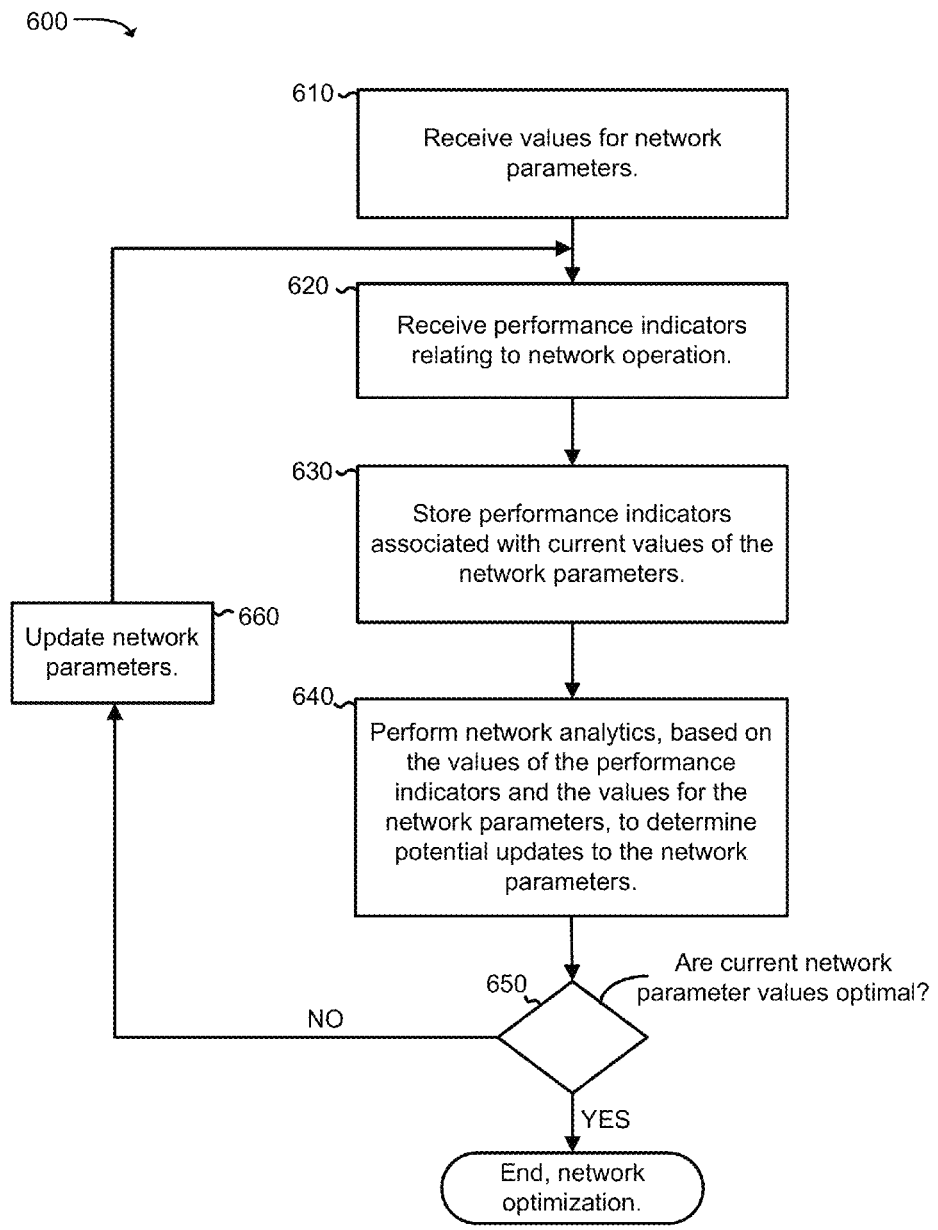
FIG. 6 is a flow chart illustrating an example process for optimizing a network for TCP sessions.

In some implementations, network optimization component 260 may operate to adjust static configuration values 310-330 and/or tunable parameters 340-360 in a manner that simultaneously takes into consideration both the optimization of TCP sessions (e.g., as modeled in model 400) and the RAN interface (e.g., as modeled in model 500). In contrast, techniques that attempt to tune network parameters relating to TCP sessions and the RAN interface, in isolation from one another (e.g., without taking both into consideration), may result in sub-optimal network tuning FIG. 6 is a flow chart illustrating an example process 600 for optimizing a network for TCP sessions. Process 600 may be implemented, for example, by network optimization component 260.

Process 600 may include receiving values for the current network parameters (block 610). As previously mentioned, the network parameters may include static configuration values and tunable parameters. In one implementation, and as illustrated in FIG. 3, the network parameters may be received from a number of network devices, such as network devices corresponding to end-to-end TCP connections in environment 200 (e.g., UE 210, eNodeB 232, SGW 236, PGW 238, and server 250). In other implementations, the network parameters may be received from network devices corresponding to a subset of an end-to-end connection (e.g., UE 210, eNodeB 232, SGW 236, and PGW 238; but not server 250).

The received network parameters may include, for example, values for static configuration values 310-330 and/or tunable parameters 340-360. As previously mentioned, static configuration values 310-330 may include, for example, values relating to particular protocols used. Tunable parameters 340-360 may include, for example, values relating to the transmission of data in the radio access interface, such as: the number of retries relating to the RLC layer, timeout values relating to the RLC layer, number of retries relating to the HARQ process in the MAC layer, timeout values relating to the HARQ process in the MAC layer, values relating to cell selection for cells in the RAN interface, values relating to power control of the RAN interface (e.g., radio power levels used by UEs 210 and eNodeB 232), values relating to capacity management for the RAN interface, and/or values relating to mobility for the RAN interface (e.g., handoff thresholds). Tunable parameters 340-360 may also include, for example, values relating to traffic control in TCP sessions, such as: values relating to TCP wait intervals, values relating to the maximum/minimum number of allowed TCP connections, values relating to TCP congestion control algorithms, values relating to TCP compression algorithms, and/or other TCP related values.

Process 600 may further include receiving information regarding performance indicators relating to the operation of the network (block 620). In one implementation, the performance indicators may include values that quantify the performance of the network in environment 200. The performance indicators may relate to, for example, throughput, latency, packet loss, or other performance indicators. In one implementation, the performance indicators may include a value that quantifies the theoretical capacity of the RAN relative to the capacity that is actually used by the TCP sessions. The calculation of this performance indicator will be described in more detail below.

The performance indicators may be received by network optimization component 260 from one or more network devices, such as the network devices corresponding to end-to-end TCP connections in environment 200 (e.g., UE 210, eNodeB 232, SGW 236, PGW 238, and server 250). In other implementations, the performance indicators may be received from network devices corresponding to a subset of an end-to-end connection (e.g., UE 210, eNodeB 232, SGW 236, and PGW 238; but not server 250).

In some implementations, only a single performance indicator may be monitored by network optimization component 260. For example, assume that total network throughput is determined, such as by a network administrator, to be the performance indicator that is most relevant for optimization of environment 200. In this case, network optimization component 260 may perform network optimization based on throughput values (e.g., not based on measures of latency, packet loss, and/or other indicators). In other implementations, multiple performance indicators may be used and analyzed by network optimization component 260 when optimizing the operation of environment 200.

Process 600 may further include storing the received performance indicators in association with the values for the current network parameters (block 630). For example, network optimization component 260 may store, for the values of the current network parameters, the corresponding values of the performance indicators, as received in block 620.

Process 600 may further include performing network analytics, based on the received values of the performance indicators and the values of the network parameters, to determine potential updates to the network parameters (block 640). In one implementation, network optimization component 260 may perform the network analytics to determine incremental changes to one or more of tunable parameters 340-360, to potentially improve the values of the performance indicators. For example, in a situation in which performance indicators are based on TCP throughput values, network optimization component 260 may determine adjustments to one or more tunable parameters 340-360 that are likely to improve the throughput values. In some implementations, network optimization component 260 may also or alternatively determine changes or optimizations to one or more of static configuration values 310-330.

In some implementations, network models, such as models 400 and 500, may be used by network optimization component 260, when performing network analytics, to assist in determining which network parameters should be changed and the amount by which these network parameters should be adjusted. For example, network optimization component 260 may simulate the expected value of the relevant performance indicators using network models, such as models 400 and 500. Based on the simulations, network optimization component 260 may determine potential updates to the network parameters. In some implementations, network optimization component 260 may use historical network parameter values and the corresponding performance indicators to update and/or optimize the network models.

In other implementations, the network analytics, performed at block 640, may be implemented using other techniques. For example, network optimization component 260 may automatically determine potential updates to the network parameters, based on the performance indicators, using machine learning techniques, statistical techniques, interpolation, or other techniques to determine modifications to tunable parameters 340-360 and/or static configuration values 310-330 that will lead to an enhancement in the performance indicators.

Process 600 may further include determining whether the current network parameters values are optimal (block 650). In one implementation, the current network parameter values may be determined to be optimal when previous adjustments to the network parameters fail to cause an improvement in the values of the performance indicators. For example, network parameters may be iteratively modified, and the resulting performance indicators monitored, until the previous modification to the network parameters fail to improve values of the performance indicators. In other implementations, other stopping conditions may be used to determine when the network parameter values (e.g., after a maximum number of iterations, when the performance indicators over a last predetermined number of iterations improve by less than a threshold amount, etc.) are optimal.

When the current network parameter values are not optimal (block 650—NO), the network parameters may be updated (block 660). The amounts to update the various network parameters may be determined in block 640. As mentioned, network optimization component 260 may determine the updates/adjustments to the network parameters in a manner that is calculated to improve the performance indicators. Network optimization component 260 may, for example, communicate with each of the network devices (e.g., UE 210, eNodeB 232, SGW 236, PGW 238, and/or server 250) that are associated with updated network parameters to update the network parameters. By updating the network parameters, the performance of the network may be affected and may thus cause the performance indicators to change. When the current network parameter values are determined to be optimal (block 650—YES), optimization processing may be complete.

Figure 7:
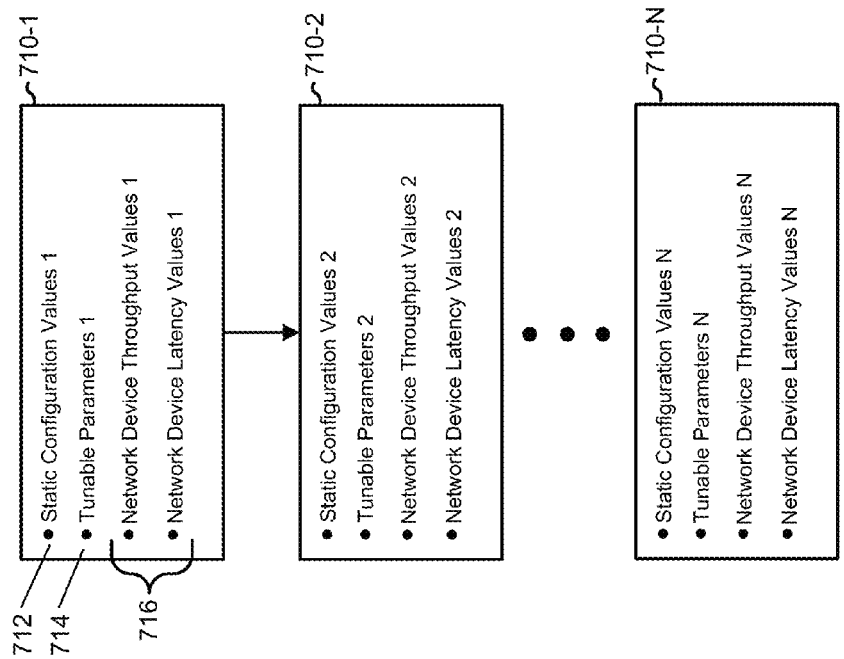
FIG. 7 is a diagram conceptually illustrating concepts shown in FIG. 6.

FIG. 7 is a diagram conceptually illustrating concepts shown in FIG. 6. Each of rectangles 710-1 through 710-N may represent a set of network parameters, having particular values, and corresponding performance indicators that were received from the network. As shown, rectangle 710-1 may represent one or more static configuration values 712 (Static Configuration Values 1) and one or more tunable parameters 714 (Tunable Parameters 1) that are implemented in the network. Additionally, rectangle 710-1 may further represent performance indicators 716 (Network Device Throughput Values 1 and Network Device Latency Values 1) that were measured in the network with the indicated network parameter values. The performance indicators "Network Device Throughput Values 1," for example, may include one or more measurements of throughput at one or more network devices in the network. Similarly, the performance indicators "Network Device Latency Values 1," for example, may include one or more measurements of latency at one or more network devices in the network.

Each of rectangles 710-1 through 710-N, in FIG. 7, may represent one iteration of blocks 620-660 (FIG. 6), in which network optimization component 260 may adjust network parameters and receive performance indicators relating to the network with the adjusted network parameter values. In FIG. 7, N (N>1) rectangles are illustrated, representing N iterations of blocks 620-660. Network optimization component 260 may maintain models, such as models 400 and 500, that may be used to determine how to adjust the network parameters. Additionally, the models themselves may be updated based on the received performance indicators.

As described above, the optimization of network parameters can be performed based on one or more indicators that measure the performance of a network. The optimization may be performed in an end-to-end basis in the network and may be particularly used to optimize network traffic for TCP sessions. The optimization may be performed simultaneously to adjust parameters relating to the RAN interface and to adjust parameters relating to TCP control algorithms.

In the above description, network performance indicators such as throughput, latency, and/or packet loss were discussed as being performance indicators that may be used when optimizing the network parameters. In some implementations, other performance indicators may be used. For example, the network performance indicators may include values that quantify the theoretical capacity of the RAN relative to the capacity that is actually used by the TCP sessions. A more detailed explanation of this performance indicator, called the RAN-TCP usage metric herein, will next be discussed.

In some implementations, in addition to using the RAN-TCP usage metric to optimize network parameters, as described above, the RAN-TCP usage metric may be used in other contexts. For example, the RAN-TCP usage metric may be used to quantify the effectiveness of a particular optimization product or solution. Consider the situation in which a network operator is considering whether to purchase a network optimization product that is being offered by a particular vendor. The network operator may use the RAN-TCP usage metric to evaluate the effectiveness of the optimization product of the vendor by comparing values of the RAN-TCP usage metric before and after provisioning of the optimization product.

Figure 8:
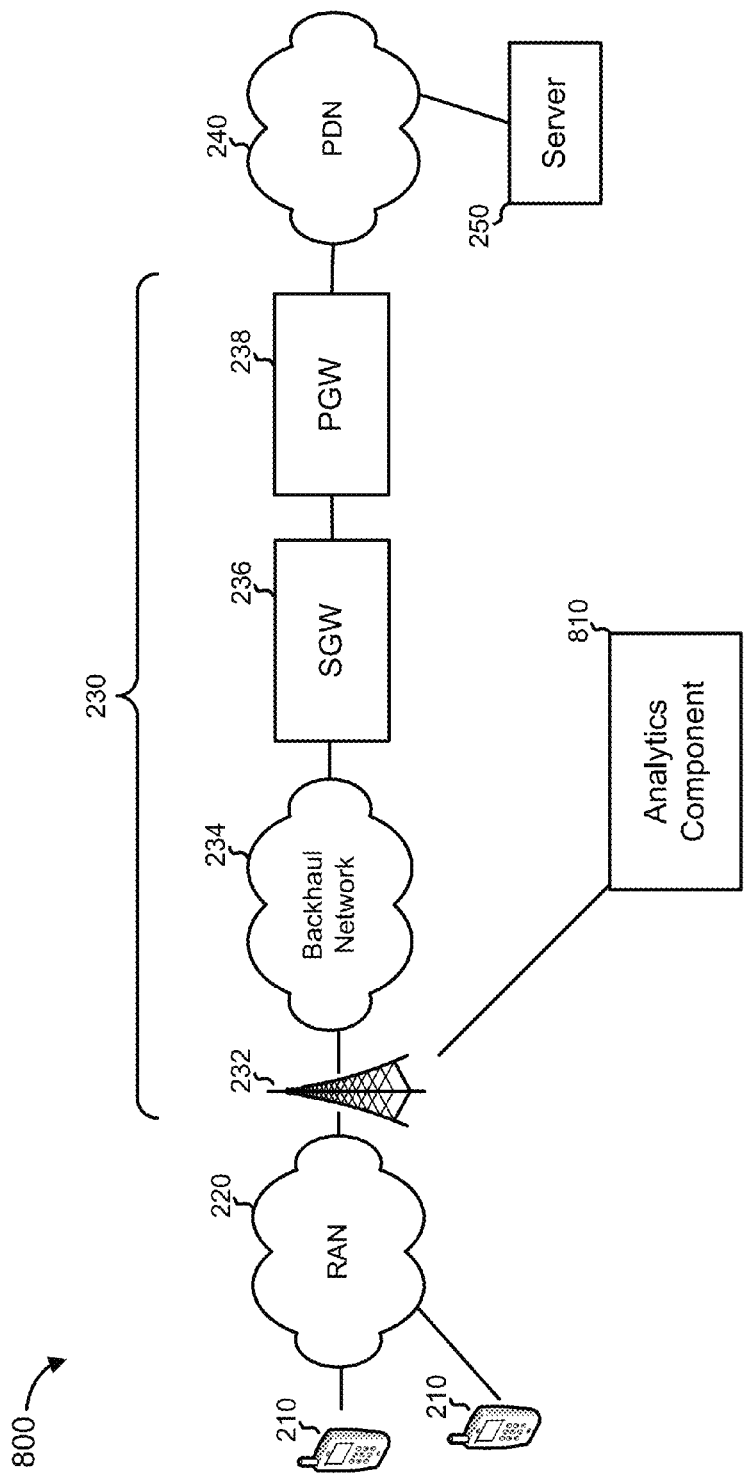
FIG. 8 is a diagram of an example environment in which systems and/or methods, relating to the calculation of RAN-TCP usage metric, may be implemented.

FIG. 8 is a diagram of an example environment 800 in which systems and/or methods, relating to the calculation of the RAN-TCP usage metric, may be implemented. Environment 800 may generally be similar to environment 200 (FIG. 2). For instance, environment 800 may include one or more UEs 210, RAN 220, wireless core network 230 (including eNodeB 232, backhaul network 234, SGW 236, and PGW 238), PDN 240, and server 250. In place of network optimization component 260, however, environment 800 may include analytics component 810. In other implementations, environment 800 may include both network optimization component 260 and analytics component 810. In this situation, network optimization component 260 and analytics component 810 may be implemented at the same or at different network devices.

Analytics component 810 may include one or more computation and communication devices that operate to calculate the RAN-TCP usage metric. The operation of analytics component 810 will be described in more detail below. Although FIG. 8 illustrates example components of environment 800 in other implementations, environment 800 may contain fewer components, different components, differently arranged components, or additional components than those depicted in FIG. 8. Alternatively, or additionally, one or more components of environment 800 may perform one or more other tasks described as being performed by one or more other components of environment 800. For example, the functions performed by analytics component 810 may be performed by eNodeB 232.

Figure 9:
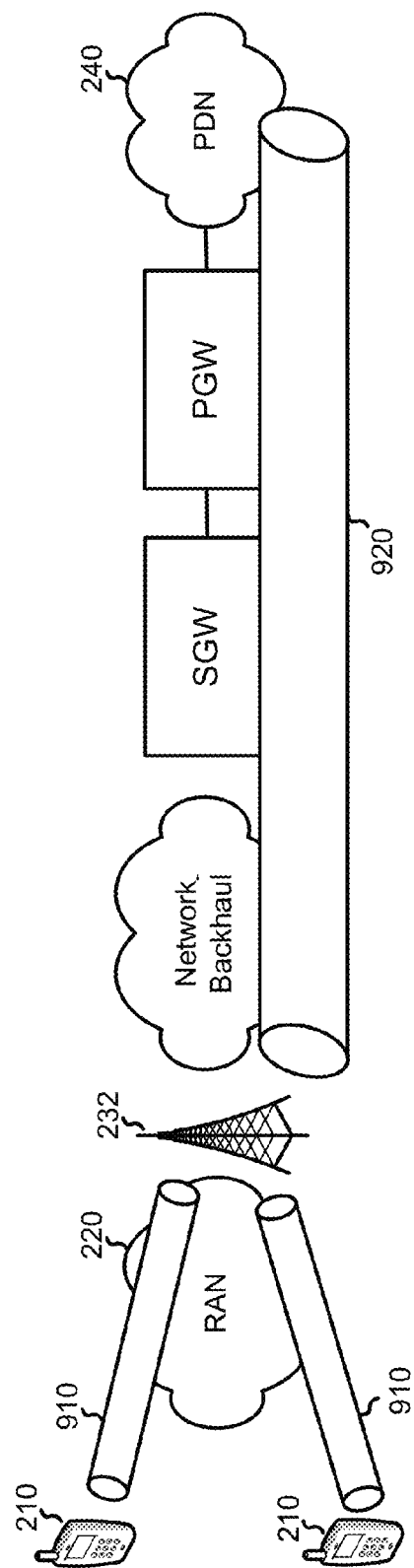
FIG. 9 is a diagram that conceptually illustrates traffic flows for TCP traffic in an environment that includes a radio access network interface.

FIG. 9 is a diagram that conceptually illustrates data flows for TCP traffic in an environment that includes a RAN interface. The environment of FIG. 9 may correspond to, for example, environment 800.

As shown in FIG. 9, network traffic may conceptually be divided into traffic on the RAN side of the network (i.e., network traffic between eNodeB 232 and UEs 210, which traverses RAN 220) and network traffic in the core and/or wired portion of the network (e.g., network traffic between eNodeB 232 and PDN 240). TCP traffic on the RAN side of the network is illustrated as TCP flows 910. TCP traffic on the core and/or wired portion of the network is illustrated as TCP flow 920. TCP flow 920 may be a shared flow that may tend to have a significantly higher capacity than each of the individual TCP flows 910. Each individual TCP flow 910 may correspond to a different network bearer and the instantaneous capacity (e.g., bandwidth) of each TCP flow 910 may vary relatively quickly depending on, for example, the channel quality, the modulation schemes being used, the scheduling algorithms being used, etc.

Figure 10:
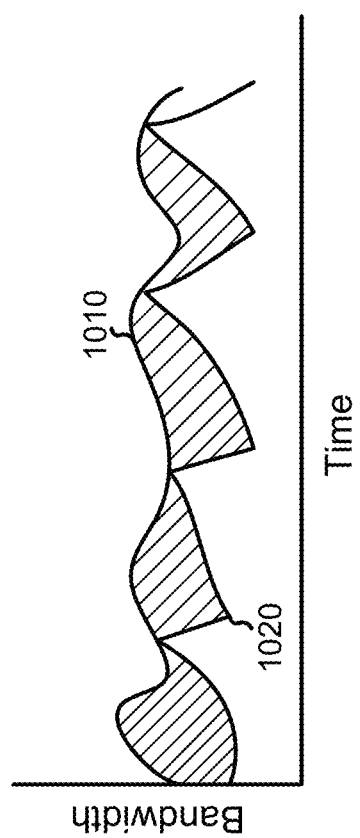
FIG. 10 is a diagram illustrating an example of bandwidth corresponding to one of the traffic flows shown in FIG. 9.

FIG. 10 is a diagram illustrating an example of bandwidth corresponding to traffic flow 910. Traffic flow 910 may correspond to a single bearer in the network. In FIG. 10, upper curve 1010 may represent the theoretical capacity of the RAN interface. Lower curve 1020 may represent the throughput of bits successfully transmitted over the air that is actually used by traffic flow 910. The instantaneous capacity of TCP flow 910 may be based on a number of factors corresponding to the parameters that define the TCP session, such as congestion control parameters for the TCP session. The difference in the capacity of upper curve 1010 and lower curve 1020, illustrated by cross-hatching in FIG. 10, may represent the theoretical wasted capacity in the RAN. In some situations, the parameters that control the bandwidth of a TCP session may not be well suited for a RAN interface, in which the instantaneous capacity of the RAN interface may quickly vary. As illustrated in FIG. 10, the rate at which the potential capacity of the RAN changes may not match up well with the TCP congestion control algorithms (which may be tuned for traffic flows such as traffic flows through the core/wired portion of the network), which may tend to inefficiently use the potential of the RAN interface.

Figure 11:
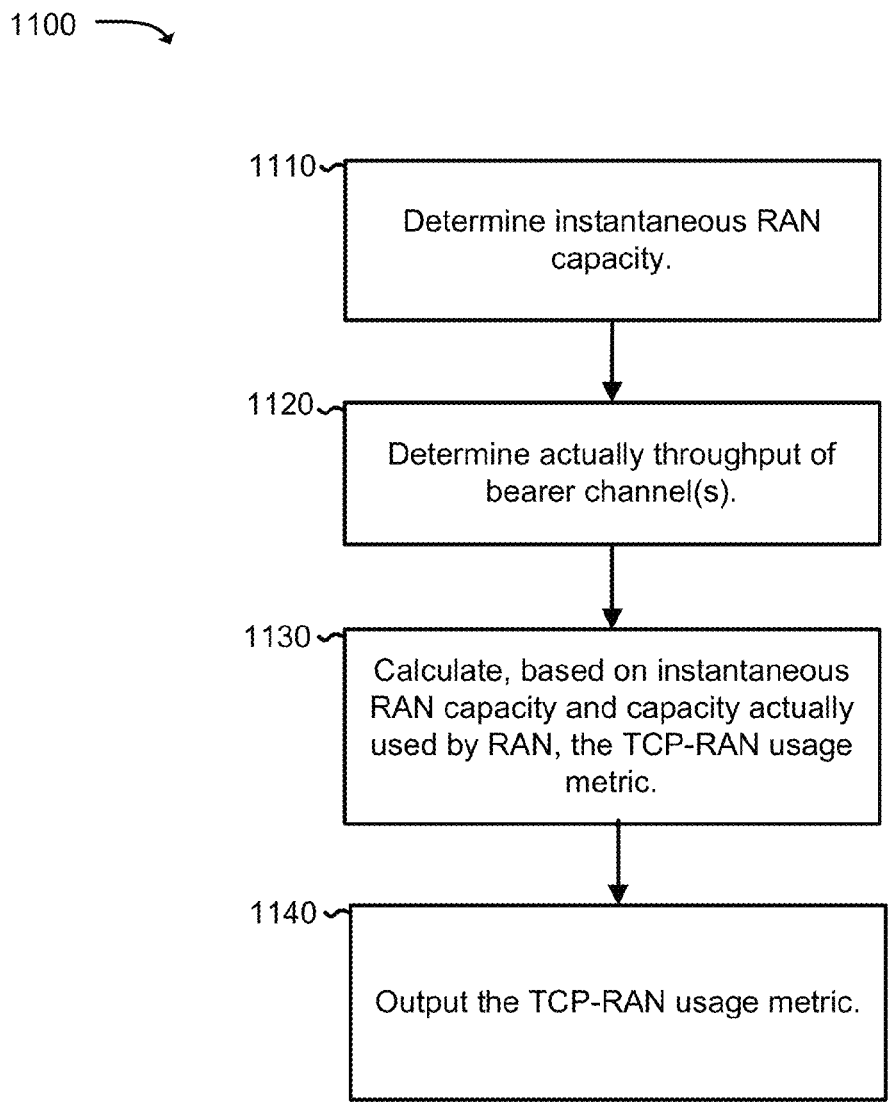
FIG. 11 is a flow chart illustrating an example process for determining the TCP-RAN usage metric.

FIG. 11 is a flow chart illustrating an example process 1100 for determining the RAN-TCP usage metric. Process 1100 may be implemented, for example, by analytics component 810, eNodeB 232, and/or a combination of analytics component 810 and eNodeB 232. Process 1100 may be performed on a per-bearer basis (e.g., per-UE or per network connection).

Process 1100 may include determining the instantaneous potential RAN capacity (block 1110). The instantaneous RAN capacity may be determined on a per-bearer channel basis. In one implementation, the instantaneous RAN capacity may be calculated as a series of capacity values in which the series is divided into timeslots (e.g., 1 millisecond (ms) timeslots, 50 ms timeslots, etc.). eNodeB 232 may directly or indirectly measure capacity, for a bearer channel, for each 1 ms transmission time interval (TTI) timeslot. Alternatively or additionally, eNodeB 232 may estimate the instantaneous RAN capacity based on values that are measured at eNodeB 232 or elsewhere. The values may include, for example, values relating to connection quality, values relating to latency at the RLC and/or MAC layer, values relating to retries performed at the RLC and/or MAC layer, or other values. In one implementation, the potential RAN capacity, for a bearer, may be computed based on the amount of Resource Blocks Allocated to the bearer and the modulation scheme being used.

Process 110 may further include determining the actual throughput of a bearer channel (block 1120). For example, eNodeB 232 may measure the amount of data that was actually transmitted, over a bearer channel and to a particular UE, over the RAN. In one implementation, eNodeB 232 may determine the number of bytes (or other unit of data) that were successfully transferred based on the number of acknowledgement received at the RLC layer during AM mode RLC transport. In some implementations, eNodeB 232 may calculate the indication of the capacity actually used by the RAN and transmit the calculated values to analytic component 810. In other implementations, eNodeB 232 may transmit, to eNodeB 232, information that may be used by analytic component 810 to determine the capacity actually used by the RAN.

Process 1100 may further include calculating, based on the instantaneous potential RAN capacity and based on the capacity actually used by the RAN, the TCP-RAN usage metric (block 1130). The TCP-RAN usage metric may be calculated based on the difference between the instantaneous potential RAN capacity and on the capacity actually used by the RAN. For example, the TCP-RAN usage metric may be calculated as the area, over a certain time period, defined by the difference between curves generated based on the instantaneous potential RAN capacity values and on the capacity actually used.

Process 1100 may further include outputting the TCP-RAN usage metric (block 1140). For example, analytics component 810 may output the TCP-RAN usage metric to a network administrator. The network administrator may, for example, make network administration decisions, such as decisions relating to the evaluation of a network optimization product or solution, based on the TCP-RAN usage metric. Alternatively or additionally, TCP-RAN usage metric may be output to another network device, such as network optimization component 260, as a performance indicator that may be used during the optimization of network parameters.

Figure 12:
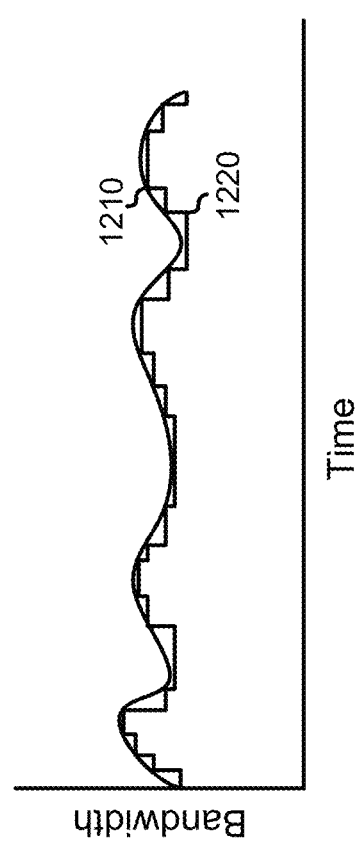
FIG. 12 is a diagram graphically illustrating an example of the calculation of the TCP-RAN usage metric.

FIG. 12 is a diagram graphically illustrating an example of the calculation of the TCP-RAN usage metric. As illustrated, upper curve 1210 may represent the potential capacity of the RAN interface for a particular bearer channel. As mentioned, the potential capacity, corresponding to upper curve 1210, may be determined by eNodeB 232 as a series of values that are determined over time (e.g., in one ms intervals). Lower curve 1220 may represent the capacity that is actually used by the bearer channel (e.g., in a TCP session). The TCP-RAN usage metric may correspond to the area between upper curve 1210 and lower curve 1220, such as the area defined by a certain time interval.

As can be seen by visual inspection of FIGS. 10 and 12, the lower curve in FIG. 12 (curve 1220) more closely tracks the upper curve in FIG. 12 (curve 1210) than the corresponding upper and lower curves in FIG. 10. This may be an indication that the TCP parameters that are being used in the network corresponding to FIG. 12 may be more appropriately tuned, with respect to the RAN interface, than the TCP parameters that are being used in the network corresponding to FIG. 10. The TCP-RAN usage metric for FIG. 12 may correspondingly be lower (indicating better performance) than the TCP-RAN usage metric for FIG. 10.

As previously mentioned, in one implementation, the TCP-RAN usage metric may be used to evaluate the effectiveness of network optimization products. In another possible implementation, the TCP-RAN usage metric may be used as a performance indictor for network parameter optimization, described above.

Figure 13:
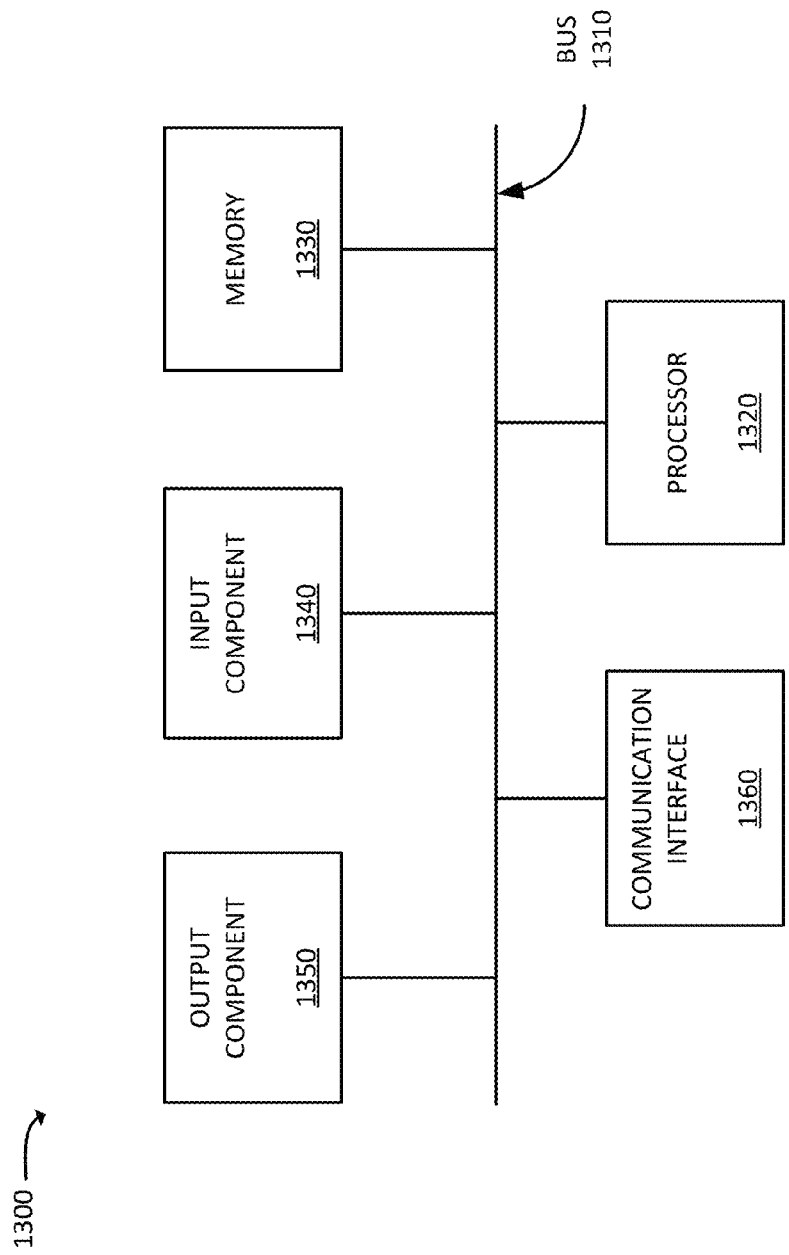
FIG. 13 is a diagram of example components of a device.

FIG. 13 is a diagram of example components of a device 1300. Each of the devices illustrated in FIGS. 1-3, 8, and 9 may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIGS. 6 and 11, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
    receiving, by one or more computing devices, values for a plurality of network parameters, the network parameters including network parameters associated with operation of a plurality of devices in a network, at least a first portion of the network parameters relating to traffic control in transmission control protocol (TCP) sessions in the network and at least a second portion of the network parameters relating to data transmission in a radio access interface in the network;
    receiving, by the one or more computing devices, values for performance indicators that define a performance of one or more aspects of the network; and
    modifying, by the one or more computing devices, two or more of the plurality of network parameters based on the received values for the plurality of network parameters and based on the received performance indicators, to optimize performance of the network with respect to the performance indicators, wherein the modified parameters include:
        at least one parameter from the first portion of the network parameters relating to traffic control in the TCP sessions, and
        at least one parameter from the second portion of the network parameters relating to data transmission in the radio access interface in the network.

2. The method of claim 1, wherein the modification of the one or more of the plurality of network parameters further includes:
    receiving a plurality of sets of the values for the performance indicators; and
    iteratively modifying, to optimize the performance of the network, the two or more of the plurality of the network parameters based on the received plurality of sets of values of the performance indicators.

3. The method of claim 1, wherein the modification of the two or more of the plurality of network parameters further includes:
    determining an amount to adjust the two or more of the plurality of network parameters based on one or more models constructed for the network.

4. The method of claim 3, wherein the one or more models constructed for the network include models based on M/M/1 queueing systems.

5. The method of claim 3, wherein the one or more models constructed for the network include a first M/M/1 model that models the network at the TCP protocol level and a second M/M/1 model that models the network at a radio link control (RLC) and media access control (MAC) layer.

6. The method of claim 1,
    wherein the first portion of network parameters relate to at least one of values relating to TCP wait intervals, values relating to the maximum/minimum number of allowed TCP connections, values relating to TCP congestion control algorithms, or values relating to TCP compression algorithm; and
    wherein the second portion of network parameters relate to least one of a number of retries relating to a radio link control (RLC) layer in the network, timeout values relating to the RLC layer in the network, a number of retries relating to a hybrid automatic repeat request (HARQ) process in a media access control (MAC) layer, timeout values relating to the HARQ process in the MAC layer, values relating to cell selection for cells in the radio access interface, or values relating to radio power levels in the radio access interface.

7. The method of claim 1, wherein the plurality of network parameters include tunable parameters that operate to refine one or more protocols or processes that are implemented by the network and static configuration values that operate to cause selection, during initial configuration or reboot of one or more of the plurality of devices in the network, of one or more protocols or processes that are implemented by the one or more of the plurality of devices in the network.

8. The method of claim 1, wherein the performance indicators include indicators relating to network throughput, latency, or packet loss.

9. The method of claim 1, wherein the performance indicators include at least one performance indicator that measures a theoretical capacity of radio interfaces of the network relative to a capacity that is actually used by the radio interfaces.

10. The method of claim 1, wherein the plurality of devices in the network include user equipment (UE), an evolved NodeB (eNodeB), and a service gateway (SGW).

11. A device comprising:
    a memory; and
    at least one processor to execute instructions in the memory to:
        receive values for a plurality of network parameters, the network parameters including network parameters associated with a plurality of devices in a network, at least a first portion of the network parameters relating to traffic control in transmission control protocol (TCP) sessions in the network and at least a second portion of the network parameters relating to data transmission in a radio access interface in the network;
        receive values for performance indicators that define a performance of one or more aspects of the network; and modify two or more of the plurality of network parameters based on the received values for the plurality of network parameters and based on the received performance indicators, to optimize performance of the network with respect to the performance indicators, wherein the modified parameters include:
  at least one parameter, from the first portion of the network parameters, relating to traffic control in the TCP sessions, and
  at least one parameter, from the second portion of the network parameters, relating to data transmission in the radio access interface in the network.

12. The device of claim 11, wherein, when modifying the two or more of the plurality of network parameters, the at least one processor is to further execute instructions in the memory to:
  receive a plurality of sets of the values for the performance indicators; and
  iteratively modify, to optimize the performance of the network, the two or more of the plurality of the network parameters based on the received plurality of sets of values of the performance indicators.

13. The device of claim 11, wherein, when modifying the two or more of the plurality of network parameters, the at least one processor is to further execute instructions in the memory to:
  determine an amount to adjust the two or more of the plurality of network parameters based on one or more models constructed for the network.

14. The device of claim 13, wherein the one or more models constructed for the network include a first M/M/1 model that models the network at the TCP protocol level and a second M/M/1 model that models the network at a radio link control (RLC) and media access control (MAC) layer.

15. The device of claim 11, wherein the performance indicators include at least one performance indicator that measures a theoretical capacity of radio interfaces of the network relative to a capacity that is actually used by the radio interfaces.

16. A method comprising:
  configuring, by one or more computing devices, network parameters at a plurality of devices in a network, the configured network parameters including network parameters that relate to:
    traffic control in transmission control protocol (TCP) sessions in the network, and
    network parameters that relate to data transmission in a radio access interface in the network;
  receiving, by the one or more computing devices, values for performance indicators that define a performance of one or more aspects of the network;
  updating, by the one or more computing devices and based on the values for the performance indicators, values for the network parameters related to traffic control in the TCP sessions and values for the network parameters related to data transmission in the radio access interface, the updated values for the network parameters being determined based on at least one M/M/1 queueing system model constructed for the network;
  reconfiguring, by the one or more computing devices and based on the updated values for the network parameters, at least some of the network parameters at the plurality of devices in the network;
  receiving, by the one or more computing devices and based on the reconfigured devices in the network, updated values for the performance indicators; and
  repeating, by the one or more computing devices, the updating, reconfiguring, and receiving of the updated values to optimize performance of the network with respect to the performance indicators.

17. The method of claim 16, wherein the at least one M/M/1 queuing system model includes a first M/M/1 model that models the network at the TCP protocol level and a second M/M/1 model that models the network at a radio link control (RLC) and media access control (MAC) layer.

18. The method of claim 16,
  wherein the network parameters that relate to traffic control in TCP sessions include at least one value relating to TCP wait intervals, maximum/minimum number of allowed TCP connections, TCP congestion control algorithms, or a TCP compression algorithm; and
  wherein the network parameters that relate to data transmission in the radio access interface in the network include at least one of a number of retries relating to a radio link control (RLC) layer in the network, timeout values relating to the RLC layer in the network, a number of retries relating to a hybrid automatic repeat request (HARQ) process in a media access control (MAC) layer, timeout values relating to the HARQ process in the MAC layer, values relating to cell selection for cells in the radio access interface, or values relating to radio power levels in the radio access interface.

19. The method of claim 16, wherein the performance indicators include at least one performance indicator that measures a theoretical capacity of radio interfaces of the network relative to a capacity that is actually used by the radio interfaces.

20. The method of claim 16, further including:
  updating the least one M/M/1 queueing system model based on the received values for the performance indicators.

* * * * *